United States Patent Office 3,324,732
Patented June 13, 1967

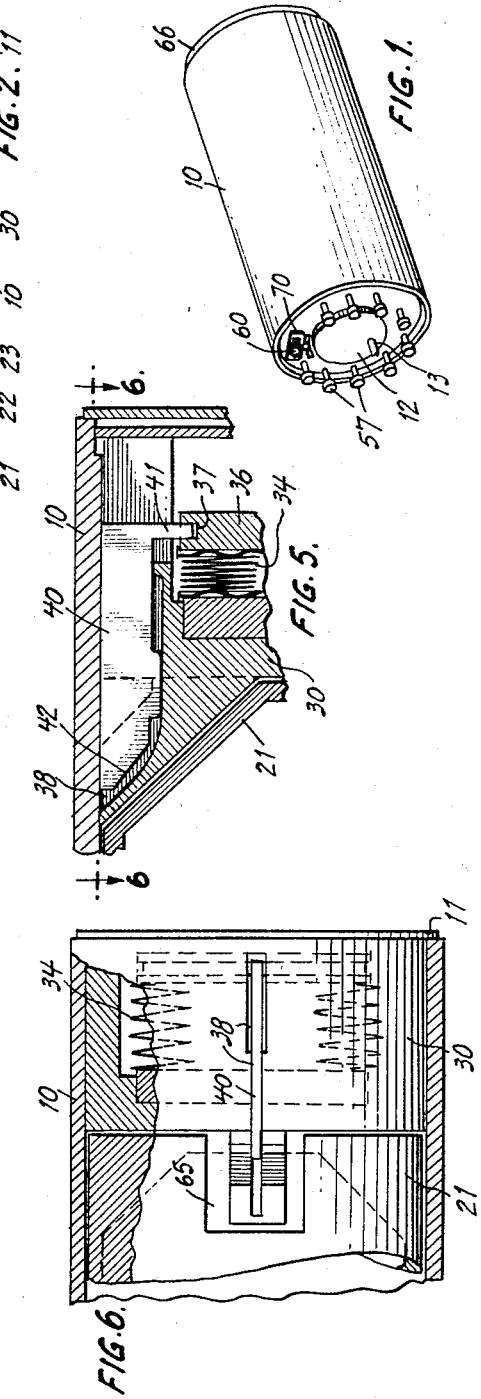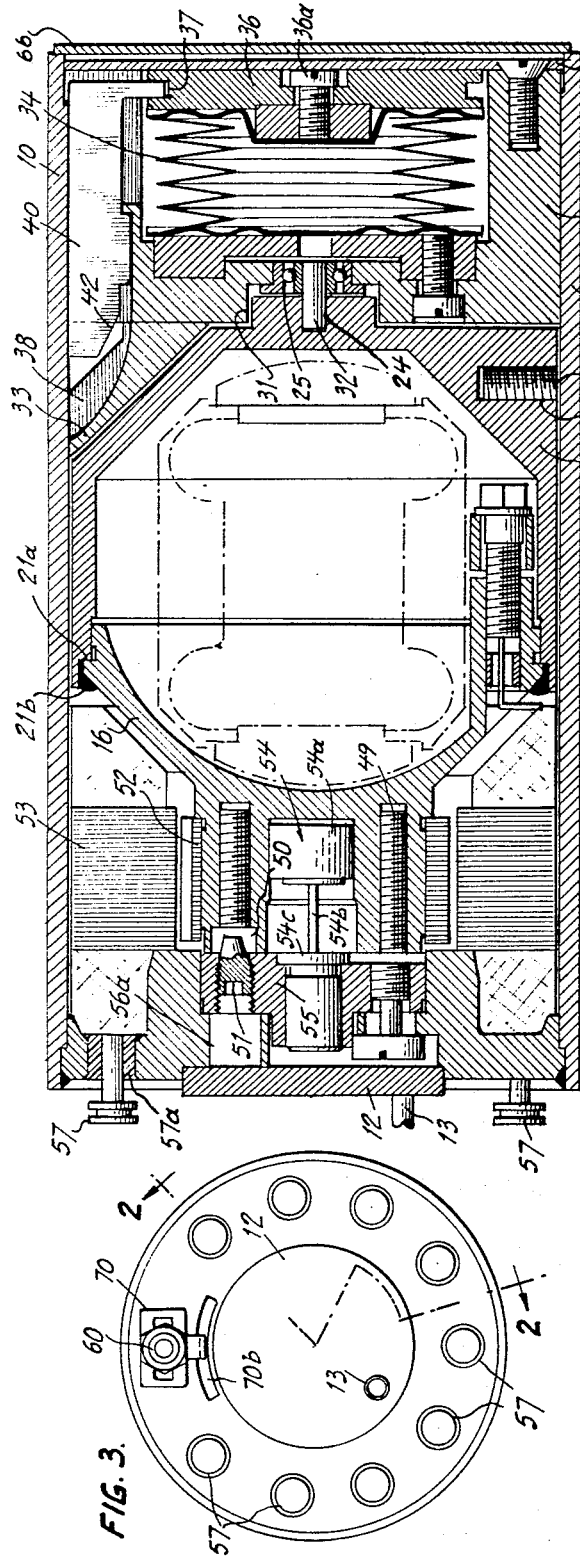

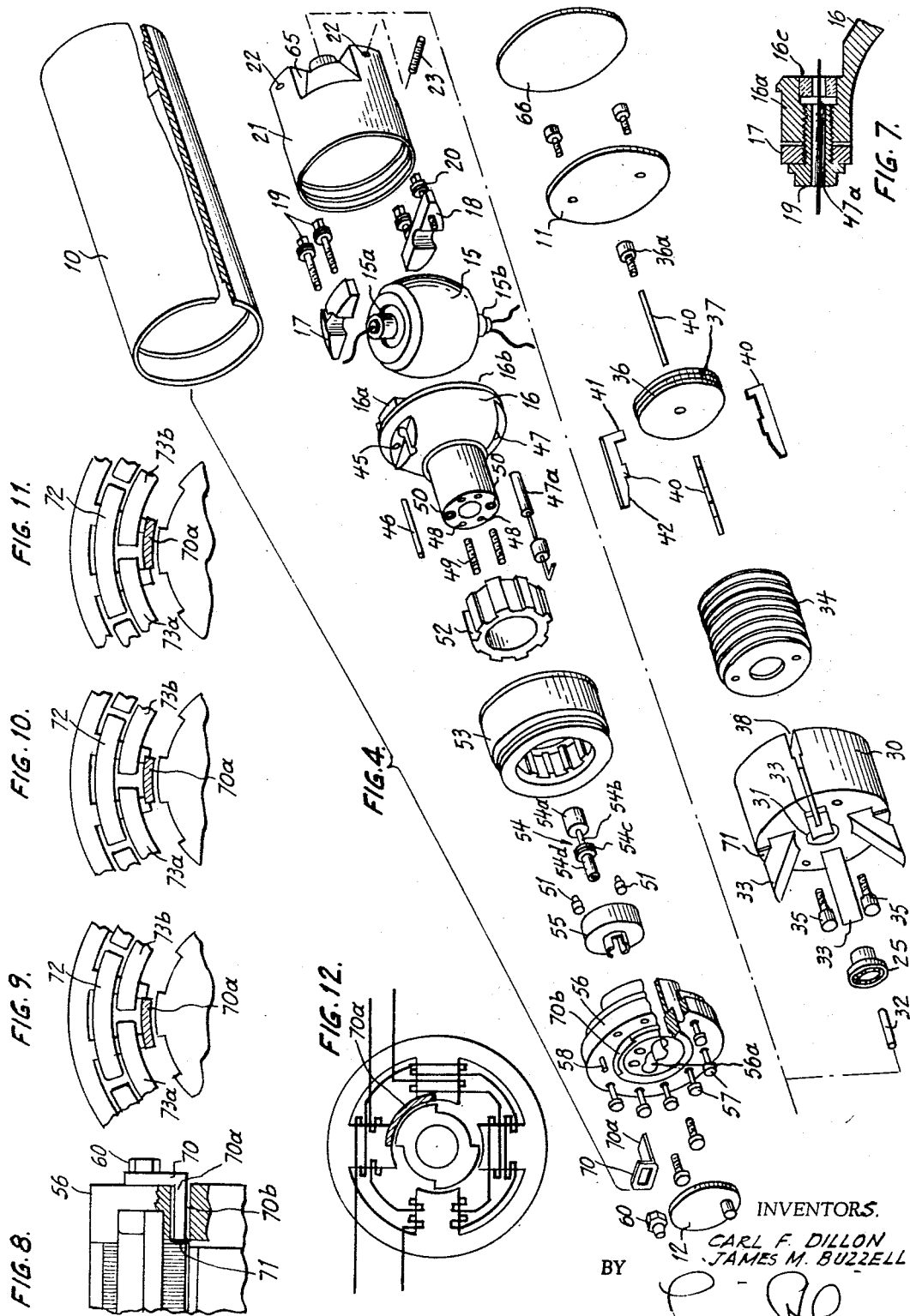

3,324,732
NULL ADJUSTMENT FOR GYRO SYSTEMS
Carl F. Dillon, Lowell, Mass., and James M. Buzzell, Northwood, N.H., assignors to Sanders Associates, Inc., Nashua, N.H., a corporation of Delaware
Filed Oct. 24, 1963, Ser. No. 318,609
10 Claims. (Cl. 74—5.6)

This invention relates to gyros and more particularly to fluid damped rate gyros.

In such instruments, the gyro wheel is mounted in a gimbal system so as to have only one degree of freedom, and the spin axis is so oriented that rotation about the input axis causes the gyro to develop a torque, producing rotation about its single axis of freedom. Such rotation is opposed by resilient action to give a quantitative indication of the action to be measured.

Rotation of the gimbal about its axis of freedom, as above mentioned, is damped by fluid, more particularly liquid, and the damping liquid separates the gimbal assembly from the outer housing by a small space, of the order of 0.007 inch, thereby providing relatively high shock protection for the gyro mechanism, even with preferred low viscosity damping liquid.

It has been found that changes in temperature cause changes in the damping, due to changes in the viscosity of the liquid with temperature, which in turn affect the readings obtained. Accordingly, it is desirable to provide a damping system affording constant damping within wide variations of temperature.

Rotation of the gyro about its single axis of freedom, in response to rotation about its input axis, is measured by a rotary differential transformer commonly called a "Microsyn," having a rotor mounted on the gimbal system for rotation therewith, and a stator mounted within the system housing carrying the input and output windings.

Such transformers in the past have had a null adjustment for zero signal when there is no rate input to the gyro, but such adjustments in the past have been relatively large in size, inefficient, and expensive to manufacture.

By the present invention, we have provided an improved null adjusting means which is very efficient, small in size, requiring little space to operate, and inexpensive to manufacture.

From the foregoing it will be understood that among the objects of this invention are:

To provide an improved null adjustment for such gyros which shall be very efficient, small in size, simple and economical to manufacture, and simple to adjust.

To provide an improved null adjustment which may be adjusted after the gyro system has been assembled and the damping liquid injected, and which does not require disassembly and reassembly of the system.

Still other objects and advantages of our invention will be apparent from the specification.

The features of novelty which we believe to be characteristic of our invention are set forth with particularity in the appended claims. Our invention itself, however, both as to its fundamental principles and as to its particular embodiments, will best be understood by reference to the specification and accompanying drawing, in which FIG. 1 is a perspective side view of a gyroscope embodying the present invention, FIG. 2 is an enlarged view, partly in section, on lines 2—2 of FIG. 3, FIG. 3 is an end view of the gyro in accordance with our invention, FIG. 4 is an exploded perspective view of the gyro shown in FIGS. 1 and 2, FIG. 5 is a detail diagrammatic view showing one movable gate for maintaining constant damping, FIG. 6 is a similar view, partly in section, on lines 6—6 of FIG. 5, FIG. 7 is a detail of the motor lead seal, and FIGS. 8–12 are schematic diagrams illustrating the construction and operation of the null adjustment of our invention as embodied in a constant damping rate gyro.

Referring now more particularly to FIG. 1, 10 designates the cylindrical housing shown partly broken away in FIG. 4, having rear cover plate 11, rear name plate 66, and front cover plate 12, the latter carrying a projecting filler tube 13, through which damping liquid may be introduced into or removed from housing 10. This housing contains the gyro, the gimbal system, the torsion bar, the pick-off rotor and stator (rotary differential transformer), and other parts as will be described.

The motor-gyro unit 15, having shaft 67 with bearing preload nuts 15a and 15b, respectively at the top and bottom, is mounted on the forward gimbal section 16, provided with upper and lower pillow blocks 16a and 16b formed to receive the upper and lower bearing preload nuts 15a and 15b. The motor-gyro unit 15 is secured to the forward gimbal section by top and bottom bearing caps 17 and 18, each fastened in position by bearing cap bolts 19 and 20, engaging the pillow blocks 16a and 16b respectively.

Bearing cap bolts 19 and 20 are preferably hollow, as shown in FIG. 7, to permit passage of the motor lead from the outside to the inside of the gimbal, and the outer side of the forward gimbal section is provided with a glass seal 16c soldered into the gimbal, through which the motor lead passes. The glass feed-through soldered into the hole in the gimbal forms a hermetic seal, while still permitting passage of the motor lead into the gimbal. While only one is shown in FIG. 7, it will be understood that such a construction is preferably employed to bring all the motor leads into the interior of the gimbal.

The forward gimbal section 16, with the motor-gyro unit attached, is inserted by press fit a short distance into the rear gimbal section 21, to abut against inner locating cylindrical stop 21a, and the joint between the forward gimbal section 16 and the rear gimbal section 21 is preferably solder sealed as at 21b (FIG. 2), so that the entire gimbal unit is hermetically sealed.

The rear gimbal section 21 is provided with four tapped holes 22 to receive balance screws 23, by the adjustment of which the system may be roughly balanced to eliminate the error effects of linear acceleration on the output signals of the system.

The rear gimbal section 21 rotates in ball bearing assembly 25 surrounding the pivot pin 32 in depression 24 (FIG. 2) to permit rotation of the gimbal system. The outer end of rear gimbal section 21 is provided with four inwardly extending cutouts 65 spaced 90° apart circumferentially.

Adjacent the outer end of outer gimbal 21, and fixed to housing 10, there is mounted a hollow cylindrical paddle block 30 having a central opening 31 to receive ball bearing assembly 25 and pin 32. The forward end of paddle block 30 is provided with four outwardly inclined arms 33 which register with the four cutouts 65 in the outer end of rear gimbal section 21.

Mounted within the paddle block is bellows 34, having its forward end secured to the rear face of the paddle block by screws 35. Secured to the rear (free) end of bellows 34 by screw 36a is cylindrical guide plate 36, having a circumferentially extending groove 37. The paddle block 30 is provided with four longitudinally extending slots 38, spaced 90° apart circumferentially, each along the center line of each outwardly extending arm 33 respectively.

Four sliding gates 40 are provided, each gate having a straight edge cut off at an angle at 42, and having at its rear end a projection 41. One gate is inserted in each slot 38, with projection 41 riding in the cylindrical groove 37 of guide plate 36. The length of the gate is so chosen that when the bellows 34 is collapsed, the gates move forwardly to abut against the outer slanting face of arms 33, and as the bellows expands, it carries the gates in a direction away from arms 33.

Bellows 34 is sealed, and is immersed in the damping liquid within housing 10, and it will be understood that as the volume of the damping fluid is increased, the bellows moves in a direction to collapse, and moves the gates 40 toward arms 33, thereby reducing the apertures 71 through which the damping liquid can flow, and increasing the damping action. As the pressure of the damping liquid decreases, the reverse action occurs. This action will be clear from FIGS. 5 and 6.

Referring now more particularly to FIG. 4, the forward gimbal section 16 is provided with an opening 45 to which is attached an evacuation tube 46, by means of which the interior of the gimbal assembly may be evacuated after the inner and outer gimbals are assembled and sealed. Similarly, openings 47 are provided for bringing out the motor leads, these being provided with insulating sleeves 48 where they pass through the forward gimbal section.

The forward face of the forward gimbal section 16 may be provided with a series of tapped holes 48 for receiving balancing set screws 49, the number of which may be chosen to fit particular conditions. There may be none, or up to several, and offcenter counterbored holes 50 may be provided to receive stop screws 51. These screws may be adjusted through central holes 56a in forward end cap 56.

Pick-off rotor 52 is secured around the neck portion of inner gimbal 16 to rotate therewith, within pick-off stator 53, and, since the pick-off system per se is well known, no further description of it is believed necessary. The input and output windings which surround the stator poles have been omitted from FIG. 4.

In pick-off systems of the type used herein, rotation of the gimbal assembly is ordinarily not substantially more than 3° in either direction from central position. To assure this, stop pins 51 are provided, which are limited in motion by the wall of the counterbored hole 50. Resilient action against rotation is provided by torsion bar 54. This consists of cylindrical plug 54a which fits the central hole in the forward face of forward gimbal section 16, has a much reduced torsion portion 54b terminating in collar 54c, and has an extension 54d, tapped to receive a screw (not shown) to secure it to torsion plate 55 having a central opening to receive extension 54d.

The torsion bar and torsion plate assembly are fitted within a central opening in the rear face of front end cap 56. The pick-off stator 53 is bonded directly to the front end cap and carries a series of terminals 57 passing through insulating bushings 57a through which connections are made to the primary and secondary coils surrounding the poles of the pick-off stator (FIG. 2).

The front end cap 56 also carries null adjusting screw 58, and fine null adjust plate 70 and nut 60 for securing the fine null adjust plate in position.

The construction and operation of the null adjustment is described in detail hereinafter. It should be understood that such an adjustment is a critical factor when the gyro is incorporated into a complete system. The null adjustment may be disturbed by assembly processes, rough handling, or excessive temperature cycling. Because of these factors, and also because of the time and expense involved in draining the damping liquid, disassembling, reassembling, and refilling the system, it is desirable that the fine null adjustment be mounted for adjustment externally on the housing.

Basically our null adjustment consists of means for varying the permeability of two adjacent magnetic paths in the transformer, which will vary the null signal over a limited range. The efficiency of our invention is made possible by the close proximity of the null slug to the stator iron and windings of the transformer, which permits the adjustment device to be physically small and inexpensive to manufacture.

The null adjusting means consists of an L-shaped slug 70 of permeable magnetic material (FIGS. 4 and 8), the stem portion 70a projecting into an arcuate slot 70b in forward end cap 56 and abutting the inner pole faces of two adjacent stator poles. A thin hermetic non-magnetic sealing membrane 71 holds the liquid within the system, without affecting the null adjustment. Through membrane 71, the null slug exerts an influence on the reluctance of the magnetic circuit of the transformer.

FIG. 10 shows stem portion 70a in neutral position, centered below primary coil 72 and half way between secondary (output) coils 73a and 73b. In operation, as the slug 70 is moved from neutral position to the left, as in FIG. 9, or to the right as in FIG. 11, the null signal reaches a minimum, and at this position nut 60 is clamped to hold the adjusting slug in position. After this adjustment is made, any motion of pick-off rotor 52 will cause an increase in the output voltage of secondary winding. This voltage, combined with the phase relationship between the primary and secondary voltages, caused by the pick-off rotor position, represents useful gyro output.

In the foregoing, we have described certain preferred embodiments of our invention, and the best mode presently known to us for practicing it, but it should be understood that modifications and changes may be made without departing from the spirit and scope of our invention.

We claim:

1. In a gyro system have a motor-gyro unit mounted in gimbals within a housing having an end plate, a pick-off rotor secured to said gimbals for rotation therewith, a pick-off stator secured to said end plate, said end plate having an arcuate slot therein, a magnetic null adjust slug having a portion projecting through said arcuate slot abutting the inner end of the poles of said pick-off stator, and means for securing said slug in desired null adjust position in said arcuate slot.

2. The combination claimed in claim 1 in which the portion of said slug to be held by said securing means is provided with an elongated opening permitting limited arcuate adjustment of said slug.

3. The combination claimed in claim 1 in which the position of said slug is adjustable from the exterior of said housing.

4. The combination claimed in claim 1 in which the position of said slug and of said securing means is adjustable from the exterior of said housing.

5. The combination claimed in claim 1 in which said slug is arcuately adjustable from neutral position both clockwise and counterclockwise.

6. The combination claimed in claim 1 in which said slug is L-shaped and has an elongated opening in the base portion.

7. The combination claimed in claim 1 in which said housing contains damping liquid, and in which the inner end of said arcuate slot is provided with a non-magnetic sealing membrane preventing the escape of damping liquid but permitting said slug to abut the inner end of the stator poles.

8. The combination claimed in claim 1 in which said end plate is provided with securing means for said slug radially outside said slot.

9. The combination claimed in claim 1 in which said end plate is provided with securing means for said slug, radially outside said slot and arcuately centered with respect to said slot.

10. The combination claimed in claim 1 in which said securing means comprises an outwardly projecting threaded stud radially outside said slot and arcuately centered with respect to said slot, and in which the base of said slug has an elongated opening receiving said stud, and means engaging said stud for locking said slug in adjusted position.

References Cited

UNITED STATES PATENTS 2,537,844  1/1951  Meredith _____ 74—5.6
2,817,240  12/1957  Sanders _____ 74—5.6

FRED C. MATTERN, Jr., *Primary Examiner.*

PALMER W. SULLIVAN, *Examiner.*

J. PUFFER, *Assistant Examiner.*